United States Patent
Beaver, III et al.

(10) Patent No.: US 12,412,155 B2
(45) Date of Patent: *Sep. 9, 2025

(54) SYSTEM AND METHOD FOR ROLE-BASED COLLABORATIVE DESIGN OF CUSTOM PRODUCTS BASED ON MANUFACTURING CONSTRAINTS

(71) Applicant: Zazzle Inc., Menlo Park, CA (US)

(72) Inventors: Robert I. Beaver, III, San Francisco, CA (US); Jeffrey J. Beaver, San Francisco, CA (US); Sean Narvasa, Oakland, CA (US); Leslie Young Harvill, Olympia, WA (US); Petar S. Ivanov, Redwood City, CA (US); Parker H. Bossier, New York, NY (US); Christopher Collette, Los Angeles, CA (US)

(73) Assignee: Zazzle Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,577

(22) Filed: Oct. 17, 2022

(65) Prior Publication Data

US 2024/0127184 A1 Apr. 18, 2024
US 2025/0217767 A9 Jul. 3, 2025

Related U.S. Application Data

(63) Continuation of application No. 16/867,898, filed on May 6, 2020, now Pat. No. 11,558,394.
(Continued)

(51) Int. Cl.
G06F 3/00 (2006.01)
G06F 3/0484 (2022.01)
G06Q 10/101 (2023.01)

(52) U.S. Cl.
CPC ........ *G06Q 10/101* (2013.01); *G06F 3/0484* (2013.01)

(58) Field of Classification Search
CPC .......................... G06Q 10/101; G06F 3/0484
See application file for complete search history.

(56) References Cited

U.S. PATENT DOCUMENTS 5,732,200 A 3/1998 Becker et al.
5,897,622 A 4/1999 Blinn et al.
(Continued)

FOREIGN PATENT DOCUMENTS

CN 102799724 A 11/2012
JP 2012527702 A 11/2012
(Continued)

OTHER PUBLICATIONS

The International Searching Authority, "Search Report" in application No. PCT/US2020/031705, dated Sep. 28, 2020, 15 pages.
(Continued)

*Primary Examiner* — Jessica S Manno
*Assistant Examiner* — Andrew Chung
(74) *Attorney, Agent, or Firm* — Patterson & Sheridan LLP.; Malgorzata A. Kulczycka

(57) ABSTRACT

In some embodiments, a system and a computer-implemented method for role-based collaborative design based on manufacturing constraints are disclosed. A method comprises: receiving, at a computer collaboration system, an electronic digital editing invitation from a first user interface that executes on a first user device associated with a first user, the editing invitation comprising inviting a second user to collaborate on a digital electronic interactive design as an editor, the interactive design comprising a graphical visual representation of a physical product that is capable of custom manufacture with a plurality of variable product
(Continued)

attributes; transmitting to a second user device of the second user, the product description data for rendering the interactive design in a second user interface executing on the second user device; receiving a first modification to the interactive design from the second user interface; automatically generating a first updated product description data based on the first modification.

19 Claims, 6 Drawing Sheets

Related U.S. Application Data

(60) Provisional application No. 62/844,249, filed on May 7, 2019.

(56) References Cited

U.S. PATENT DOCUMENTS

| | | | |
|---|---|---|---|
| 5,999,914 | A | 12/1999 | Blinn et al. |
| 6,058,373 | A | 5/2000 | Blinn et al. |
| 6,343,287 | B1 | 1/2002 | Kumar et al. |
| 6,411,965 | B2 | 6/2002 | Klug |
| 6,542,515 | B1 | 4/2003 | Kumar et al. |
| 6,564,246 | B1 | 5/2003 | Varma et al. |
| 6,591,011 | B1 | 7/2003 | Nielsen |
| 6,614,451 | B1 | 9/2003 | Hudson et al. |
| 6,664,972 | B2 | 12/2003 | Eichel et al. |
| 6,725,257 | B1 | 4/2004 | Cansler et al. |
| 7,016,869 | B1 | 3/2006 | Haeberli |
| 7,062,483 | B2 | 6/2006 | Ferrari et al. |
| 7,107,226 | B1 | 9/2006 | Cassidy et al. |
| 7,117,293 | B1 | 10/2006 | Graziano et al. |
| 7,376,891 | B2 | 5/2008 | Hitchock et al. |
| 7,502,788 | B2 | 3/2009 | Balasubramanian |
| 7,536,641 | B2 | 5/2009 | Rosenstein et al. |
| 7,617,184 | B2 | 11/2009 | Ferrari et al. |
| 7,702,645 | B2 | 4/2010 | Khushraj et al. |
| 7,707,504 | B2 * | 4/2010 | Quang .................... G06F 16/11 715/734 |
| 7,725,364 | B2 | 5/2010 | Tanaka et al. |
| 7,730,053 | B2 | 6/2010 | Sauermann |
| 7,734,731 | B2 | 6/2010 | Ordille et al. |
| 7,761,397 | B2 | 7/2010 | Huelsman et al. |
| 7,777,747 | B1 | 8/2010 | Krenz |
| 7,831,589 | B2 | 11/2010 | Balasubramanian |
| 7,856,434 | B2 | 12/2010 | Gluzman Peregrine et al. |
| 7,865,523 | B2 | 1/2011 | Caballero et al. |
| 7,885,956 | B2 | 2/2011 | Danish et al. |
| 7,930,313 | B1 | 4/2011 | Geva |
| 8,175,931 | B2 | 5/2012 | Harvill et al. |
| 8,190,486 | B1 | 5/2012 | Ouimet |
| 8,290,822 | B2 | 10/2012 | Gade et al. |
| 8,335,724 | B2 | 12/2012 | Sipes et al. |
| 8,429,110 | B2 | 4/2013 | Cai et al. |
| 8,458,050 | B2 | 6/2013 | Bagley et al. |
| 8,495,072 | B1 | 7/2013 | Kapoor et al. |
| 8,495,163 | B2 | 7/2013 | Ordille et al. |
| 8,566,714 | B2 | 10/2013 | Stringer et al. |
| 8,700,492 | B1 | 4/2014 | Scott |
| 8,873,829 | B1 | 10/2014 | Tyra et al. |
| 9,269,102 | B2 | 2/2016 | Chen et al. |
| 9,704,187 | B2 | 7/2017 | Chen et al. |
| 10,346,892 | B1 | 7/2019 | Bagchi |
| 10,664,882 | B2 | 5/2020 | Chen et al. |
| 10,997,642 | B2 | 5/2021 | Chen et al. |
| 11,741,515 | B2 | 8/2023 | Chen et al. |
| 2001/0034668 | A1 | 10/2001 | Whitworth |
| 2002/0030689 | A1 | 3/2002 | Eichel et al. |
| 2002/0073001 | A1 | 6/2002 | Palmer et al. |
| 2002/0083039 | A1 | 6/2002 | Ferrari et al. |
| 2003/0038799 | A1 | 2/2003 | Smith |
| 2003/0080978 | A1 | 5/2003 | Navab et al. |
| 2003/0182402 | A1 | 9/2003 | Goodman et al. |
| 2004/0044785 | A1 | 3/2004 | Bell et al. |
| 2004/0133081 | A1 | 7/2004 | Teller et al. |
| 2004/0143644 | A1 | 7/2004 | Berton et al. |
| 2004/0212617 | A1 | 10/2004 | Fitzmaurice et al. |
| 2005/0131571 | A1 | 6/2005 | Costin |
| 2005/0138078 | A1 | 6/2005 | Christenson et al. |
| 2005/0164766 | A1 | 7/2005 | Haim et al. |
| 2005/0234993 | A1 | 10/2005 | Ordille et al. |
| 2005/0258234 | A1 | 11/2005 | Silverbrook et al. |
| 2006/0004697 | A1 | 1/2006 | Lipsky et al. |
| 2006/0038815 | A1 | 2/2006 | Loberg |
| 2006/0041421 | A1 | 2/2006 | Ta et al. |
| 2006/0107203 | A1 | 5/2006 | Schilling et al. |
| 2006/0149638 | A1 | 7/2006 | Allen |
| 2006/0155612 | A1 | 7/2006 | Haeberli |
| 2006/0197775 | A1 | 9/2006 | Neal |
| 2007/0033568 | A1 | 2/2007 | Barrieau et al. |
| 2007/0067179 | A1 | 3/2007 | Kerr et al. |
| 2007/0094204 | A1 | 4/2007 | Huelsman et al. |
| 2007/0098234 | A1 | 5/2007 | Fiala |
| 2007/0112731 | A1 | 5/2007 | Balasubramanian |
| 2007/0124215 | A1 | 5/2007 | Simmons |
| 2007/0143082 | A1 | 6/2007 | Degnan |
| 2007/0168336 | A1 | 7/2007 | Ransil et al. |
| 2007/0174781 | A1 | 7/2007 | Begin et al. |
| 2007/0203798 | A1 | 8/2007 | Caballero et al. |
| 2007/0226066 | A1 | 9/2007 | Brunner et al. |
| 2007/0226155 | A1 | 9/2007 | Yu et al. |
| 2008/0069451 | A1 | 3/2008 | Ikeda |
| 2008/0091551 | A1 | 4/2008 | Olheiser et al. |
| 2008/0162305 | A1 | 7/2008 | Rousso et al. |
| 2008/0244454 | A1 | 10/2008 | Shibaike |
| 2008/0247674 | A1 | 10/2008 | Walch |
| 2008/0285854 | A1 | 11/2008 | Kotake et al. |
| 2009/0043673 | A1 | 2/2009 | Caballero et al. |
| 2009/0043759 | A1 | 2/2009 | Danish et al. |
| 2009/0043848 | A1 | 2/2009 | Kordun |
| 2009/0089174 | A1 | 4/2009 | Brunner et al. |
| 2009/0177551 | A1 | 7/2009 | Cue et al. |
| 2009/0195538 | A1 | 8/2009 | Ryu et al. |
| 2009/0271295 | A1 | 10/2009 | Hodge |
| 2009/0282403 | A1 | 11/2009 | Poole et al. |
| 2009/0289955 | A1 | 11/2009 | Douris et al. |
| 2009/0317010 | A1 | 12/2009 | Gerhard et al. |
| 2009/0324100 | A1 | 12/2009 | Kletter et al. |
| 2010/0036753 | A1 | 2/2010 | Harvill et al. |
| 2010/0066731 | A1 | 3/2010 | Vecore et al. |
| 2010/0066750 | A1 | 3/2010 | Yu et al. |
| 2010/0092079 | A1 | 4/2010 | Aller |
| 2010/0100834 | A1 | 4/2010 | MacDonald |
| 2010/0114874 | A1 | 5/2010 | Hansson et al. |
| 2010/0145492 | A1 | 6/2010 | Russell |
| 2010/0185529 | A1 | 7/2010 | Chesnut et al. |
| 2010/0189316 | A1 | 7/2010 | Walch |
| 2010/0238166 | A1 | 9/2010 | Tamstorf et al. |
| 2010/0287511 | A1 | 11/2010 | Meier et al. |
| 2010/0299616 | A1 | 11/2010 | Chen et al. |
| 2010/0318442 | A1 | 12/2010 | Paul et al. |
| 2010/0318476 | A1 | 12/2010 | Huelsman et al. |
| 2011/0004524 | A1 | 1/2011 | Paul et al. |
| 2011/0018895 | A1 | 1/2011 | Buzyn et al. |
| 2011/0064388 | A1 | 3/2011 | Brown et al. |
| 2011/0098837 | A1 | 4/2011 | Yucel et al. |
| 2011/0208618 | A1 | 8/2011 | Christenson et al. |
| 2011/0225038 | A1 | 9/2011 | Fontoura et al. |
| 2011/0280447 | A1 | 11/2011 | Conwell |
| 2011/0305368 | A1 | 12/2011 | Osako |
| 2012/0047045 | A1 | 2/2012 | Gopikrishna et al. |
| 2012/0109777 | A1 | 5/2012 | Lipsitz et al. |
| 2012/0117072 | A1 | 5/2012 | Gokturk et al. |
| 2012/0123674 | A1 | 5/2012 | Perks et al. |
| 2012/0158535 | A1 | 6/2012 | Barrieau et al. |
| 2012/0198545 | A1 * | 8/2012 | Keenan .................... H04L 63/06 715/764 |
| 2012/0218300 | A1 | 8/2012 | Hayakawa |
| 2012/0218468 | A1 | 8/2012 | Tan et al. |
| 2012/0221428 | A1 | 8/2012 | Harvill et al. |
| 2012/0224743 | A1 | 9/2012 | Rodriguez et al. |
| 2012/0281013 | A1 | 11/2012 | Mahdavi et al. |

(56) References Cited

U.S. PATENT DOCUMENTS

| | | | |
|---|---|---|---|
| 2013/0054651 A1 | 2/2013 | Shepherd et al. | |
| 2013/0060801 A1* | 3/2013 | Beaver, III | H04N 1/00161 |
| | | | 707/758 |
| 2013/0117227 A1 | 5/2013 | Kruglick | |
| 2013/0238508 A1 | 9/2013 | Kok et al. | |
| 2013/0304604 A1 | 11/2013 | Hoffman et al. | |
| 2014/0201187 A1 | 7/2014 | Larson | |
| 2014/0215477 A1 | 7/2014 | Chen et al. | |
| 2014/0223575 A1 | 8/2014 | Nandi et al. | |
| 2014/0258832 A1 | 9/2014 | Hepp et al. | |
| 2015/0025994 A1 | 1/2015 | Beaver, III et al. | |
| 2015/0095345 A1 | 4/2015 | Arai | |
| 2015/0220882 A1 | 8/2015 | Flores et al. | |
| 2018/0075636 A1 | 3/2018 | Harvill | |
| 2018/0247243 A1* | 8/2018 | Moolman | G06F 9/45529 |
| 2018/0307794 A1 | 10/2018 | Bowman et al. | |
| 2019/0188643 A1 | 6/2019 | Marothiya et al. | |
| 2020/0063333 A1 | 2/2020 | Mahanty et al. | |
| 2020/0358783 A1 | 11/2020 | Beaver, III | |
| 2021/0118031 A1 | 4/2021 | Beaver, III et al. | |
| 2021/0192097 A1 | 6/2021 | Beaver, III et al. | |
| 2021/0266352 A1 | 8/2021 | Beaver, III et al. | |
| 2023/0360096 A1 | 11/2023 | Chen et al. | |

FOREIGN PATENT DOCUMENTS

| | | |
|---|---|---|
| WO | 03/038688 A1 | 5/2003 |
| WO | 2009094724 A1 | 8/2009 |
| WO | 2013033643 A1 | 3/2013 |
| WO | 2016054651 A1 | 4/2016 |

OTHER PUBLICATIONS

Nguyen, "The pros and cons of different data formats: key-values vs tuples", available: freecodecamp.org, published Dec. 28, 2018, 9 pages.

Current Claims in application No. PCT/US2020/031705, dated Sep. 2020, 7 pages.

Non-Final Office Action dated Jun. 27, 2023 for U.S. Appl. No. 17/507,468.

Ullah, I., & Narain, R. (2021). Linking supplier selection and management strategies with mass customization capability. The Journal of Business & Industrial Marketing, 36(7), 1213-1228. doi:http://dx.doi.org/10.1108/JBIM-04-2020-0183.

JP Office Action dtd Mar. 6, 2024 for Japanese Patent Application No. 2021-565963.

Non-Final Office Action dated Oct. 8, 2024 for U.S. Appl. No. 17/507,468.

Notice of Allowance dtd May 15, 24 for U.S. Appl. No. 17/967,590.

EP Search Report dated Nov. 23, 2023 for Application No. 20 728 606.3.

CA OA DTD Feb. 5, 2024 for Application No. CA 3,139,083.

CN Office Action DTD Jul. 11, 2024 for CN 202080033662.2.

"The pros and cons of different data format: key-values vs tuples", taken from The pros and cons of different data formats: key-values vs tuples (freecodecamp.org), published Dec. 28, 2018, pp. 1-9 (Year: 2018).

Pokemon AR Marker in Sep. 2001 ( Hyperlink "http://pokemasters/" http://pokemasters"net/forums/showthread"php?t=24845) 17 pages".

Custom Ink, "Custom T-Shirts—Design Your Own T-Shirts Online—Free Shipping!" Web.archive. org, Oct. 28, 2018, web.archive.org/web/20181028214631/www.customink.com/. (Year: 2018).

Johannes Kohler, Alain Pagani, and Didier Stricker, "Detection and Identification Techniques for Markers Used in Computer Vision, VI.UDS" 2.010.36, dated 20:I.0, 9 pages.

Jun Rekimoto and Yuji Ayatsuka, "CyberCode: Designing Augmented Reality Environments with Visual Tags", Proceedings of DARE 2000 on Designing, Dated Apr. 2000, 10 pages.

Jun Rekimoto, "Matrix: A Realtime Object Identication and Registration Method for Augmented Reality", Computer Human Interaction, Dated 1998, Proceedings, 3rd Asia Pacific, Jul. 15-17, 1998, 6 pages.

Mark Fiala, "Artag, A Fiducial Marker System Using Digital Techniques", In CVRP '05: Proceedings of the 2005 IEEE, dated 2005, 7 pages.

Martin Hirzer, "Marker Detection for Augmented Reality Applications", Graz University of Technology, Austria, Dated Oct. 27, 2008, 27 pages.

W. Lee and W. Woo, "Real-time Color Correction for Marker-Based Augmented Reality Applications", International Workshop on Ubiquitous VR (IWUVR2009), dated 2009, 4 pages.

Nima Soltani, Mehmet Yilmax, "Using Augmented-Reality on Planar Surfaced for Previewing Decor Changes", Stanford University EE368 Class Project Spring, dated 2010, 5 pages.

Hirokazu Kato et al. Marker Tracking and HMD Calibration for a Videobased Augmented Reality Conferencing System, San Francisco, USA Dated Oct. 1999, 10 pages.

Pantida Patirupanusara, Marker-Based Augmented Reality Magic Book for Anatomical Education, dated May 26-27, 2012, Phuket, 3 pages.

Paul L. Rosin, "Training Cellular Automata for Image Processing", SCIA 2005, LNCS 3540, dated 2005, 10 pages.

Qin et aL, "Product Configuration Flow From Obtaining Customer Requirement to Providing the Final Customized Product", Journal of Software, vol. 7, No. 2., dated 2012, 12 pages.

Ryan A. Beasley, Semiautonomous Medical Image Segmentation Using Seeded Cellular Automation Plus Edge Detector, dated 2012, Article ID 914232, 9 pages.

The International Searching Authority, "Search Report" in application No. PCT/US2020/053585, dated Dec. 15, 2020, 13 pages.

UXMWN:, "MyOwnBike.de", dated Sep. 11, 2012, www. Http://vimeo.com/49234243, retrieved on Oct. 14, 2014, 1 page.

Myownbike.de-individual singlespeed and fixie bikes. Dated Feb. 21, 2012, www.behance.net/gallery/3197765/myownbike-individual-singlespeed-fixie-bikes.

Current Claims in European application No. 12181208.5 1238, dated Dec. 2012, 4 pages.

"IBM Sterling Configurator—Customize complex products, services and bundles", IBM Software, available: <http://www.-01.ibm.com/software/commerce/products/products/product-configurator/>, Nov. 26, 2013.

"Knowledge-based configuration", Wikipedia, available: Hyperlink "http://en.wikipedia.org/wiki/Knowledge-based_configuration" <http://en.wikipedia.org/wiki/Knowledge-based_configuration>, retrieved Nov. 26, 2013.

"Product Configuration System", Oracle, available: <http://www.bigmachines.corn/product_configuration_system.php>, retrieved Nov. 26, 2013.

"Product Configurator", IBM, available: < http://www.-01.ibm.com/software/commerce/products/products/product-configurator/>, retrieved 11/26/20103.

Capterra Website, Top Product Configurator Software Products, dated 2014, Reviews of the Best Systems, accessed online <http:/HYPERLINK "http://www.capterra.com/product-configurator-software> on May 28, 2014, 15pgs.

Current Claims in application No. PCT/US12/53535, dated Feb. 2013, 5 pages.

International Searching Authority, "Search Report" in application No. PCT/US12/53535, dated Feb. 5, 2013, 12 pages.

Current Claims in application No. PCT/US2020/053585, dated Dec. 2020, 5 pages.

Homayoun Bagherinia O Roberto Manduchi, Robust Real-Time Detection of Multi-Color Markers on a Cell Phone, J Real-Time Image Proc., Dated Jun. 3, 2011, 17 pages.

Daniel Wagner, Tobias Langlotz, and Dieter Schmalstieg, Robust and Unobtrusive Marker Tracking on Mobile Phones, Washington, DC, USA, Dated 2008, IEEE Computer Society, 4 pages.

European Patent Office, "Search Report" in application No. PCT/US2014/044459, dated Oct. 24, 2014, 11 pages.

European Patent Office, Office Action, in application No. 12181208.5 1238, dated Dec. 6, 2012, 7 pages.

(56) References Cited

OTHER PUBLICATIONS

Evlioglu, S. Mass Customization in Footware Industry: Setting up a Web-Based Configurator. Politencico Di Milano. Dated Dec. 20, 2012.

Hirokazu Kato and Mark Billnghurst. "ARToolkit User Manual", Human Interface Technology Lab, University of Washington, dated 2000, 44 pages.

Claims for PCT application PCT/US12/53535, dated Aug. 31, 2012, 5 pages.

Current Claims in application No. PCT/US2014/044459, dated Oct. 24, 2014, 10 pages.

The International Searching Authority, "Search Report" in Application No. PCT/US2022/39571, dated Nov. 4, 2022, 11 pages.

* cited by examiner

SYSTEM AND METHOD FOR ROLE-BASED COLLABORATIVE DESIGN OF CUSTOM PRODUCTS BASED ON MANUFACTURING CONSTRAINTS

BENEFIT CLAIM; CROSS REFERENCE TO RELATED APPLICATIONS

This application claims the benefit under 35 U.S.C. § 120 as a continuation of application Ser. No. 16/867,898 filed May 6, 2020, which claims the benefit under 35 U.S.C. § 119 of provisional application 62/844,249, filed May 7, 2019, the entire contents of which are hereby incorporated by reference for all purposes as if fully set forth herein.

This application is related to U.S. Pat. No. 8,090,461, granted Jan. 3, 2012, U.S. Pat. No. 8,175,931, granted May 8, 2012; U.S. Pat. No. 8,856,160, granted Oct. 7, 2014; U.S. Pat. No. 9,355,421, granted on May 31, 2016; U.S. Pat. No. 9,400,997, granted Jul. 26, 2016; U.S. Pat. No. 10,176,617, granted Jan. 8, 2019; and US patent application no. 2013/0060654, filed Aug. 29, 2012; the entire contents of each of which are hereby incorporated by reference for all purposes as if fully set forth herein.

FIELD OF THE DISCLOSURE

One technical field of the disclosure is computer security as applied to multi-user computer-aided visual design of physical products that are capable of customization before manufacture. Another technical field is synchronization and coordination of concurrently received collaborative input to systems supporting multi-user computer-aided visual design of physical products that are capable of customization before manufacture. Yet another technical field is the validation of data input to systems supporting multi-user computer-aided visual design of physical products that are capable of customization before manufacture, including enforcing manufacturing constraints.

BACKGROUND

Early examples of computer-implemented collaboration applications include tools that offer collaborative text editing, text messaging, and shared-calendar planning. Other collaboration applications offer shared spreadsheets, video conferencing, and picture sharing applications.

The development of collaboration applications may be stimulated by innovations in information technologies and manufacturing. For example, due to many recent technological advances, many physical products may be customized via online, interactive user input to an ordering system before the products are ordered from manufacturers and made. Customization of a product may include receiving digital user input defining attributes for the product and using the attributes to, for example, customize the appearance of the product. However, navigating through countless sets of attributes and dealing with, for example, countless clicks to complete the customization may be very difficult and cumbersome.

As a result, in many cases, rather than dealing with the complexities of the product-customization, computer users tend to skip over customization opportunities and order products as they appear in their default configurations.

SUMMARY

The appended claims may serve as a summary of the disclosure.

DETAILED DESCRIPTION

Figure 1:
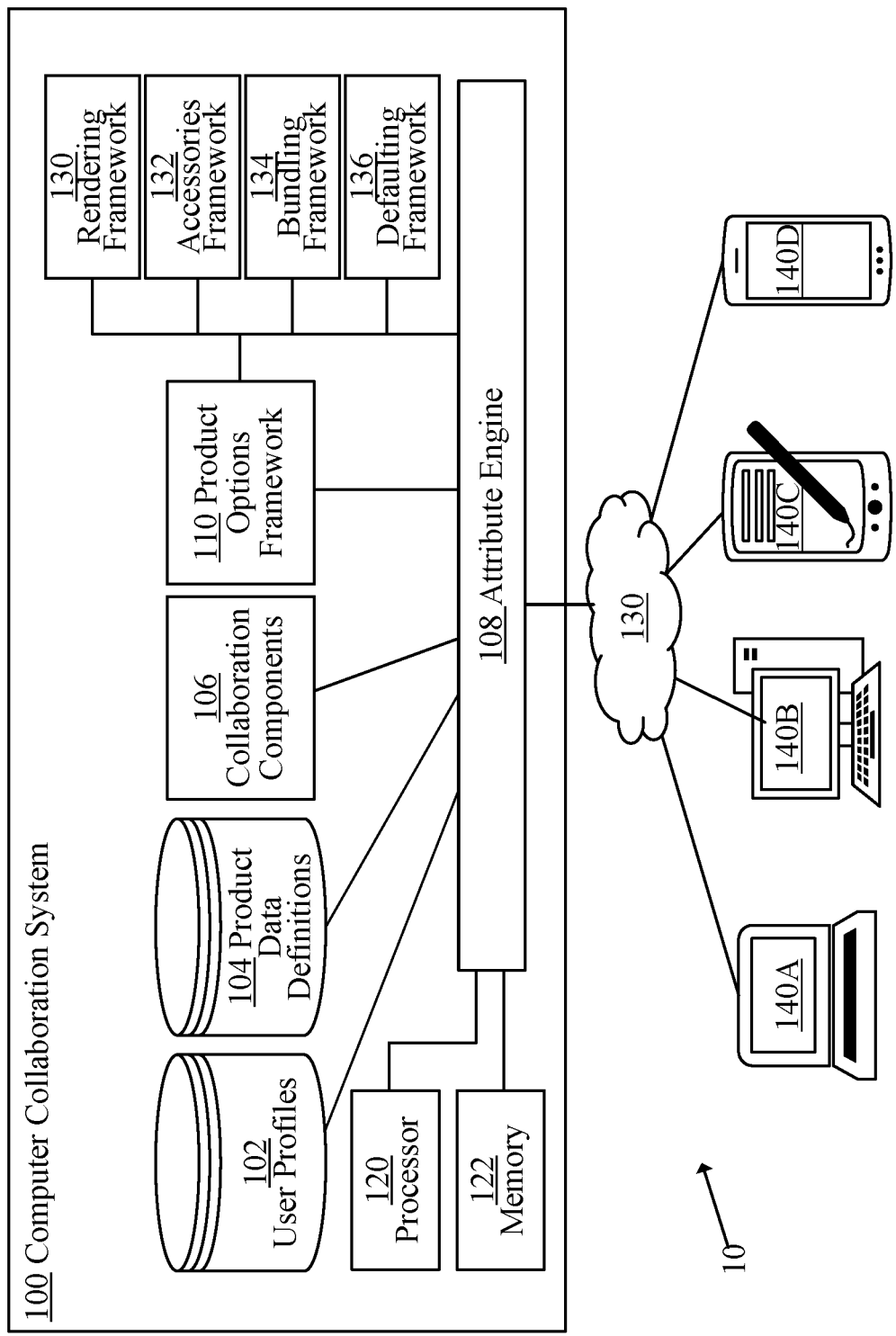
FIG. 1 is a block diagram showing an example computer system for providing a role-based collaborative platform.

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach. Embodiments are disclosed in sections according to the following outline:

1. GENERAL OVERVIEW
2. EXAMPLE ROLE-BASED COLLABORATION PLATFORM
    2.1. COMPUTER COLLABORATION SYSTEM
    2.2. COLLABORATION COMPONENTS
        2.2.1. ATTRIBUTE REPRESENTATIONS
        2.2.2. REPRESENTATIONS OF USER INTERFACE ELEMENTS
        2.2.3. REPRESENTATIONS OF USER INTERFACE ELEMENTS FOR DESIGN AREAS
        2.2.4. REPRESENTATIONS OF FINISHED CUSTOMIZED PRODUCTS
        2.2.5. REPRESENTATIONS OF PRODUCTS DURING A CUSTOMIZATION PHASE
        2.2.6. REPRESENTATIONS OF PRODUCT VIEWS
    2.3. PRODUCT OPTIONS FRAMEWORK
    2.4. ATTRIBUTE ENGINE
    2.5. USER DEVICES
3. USER ROLES
4. COLLABORATION EXAMPLES
    4.1. CUSTOMER-AGENT COLLABORATION
    4.2. CUSTOMER-PEER COLLABORATION
    4.3. EDUCATIONAL AND MANAGEMENT COLLABORATION
    4.4. COLLABORATION USING SERIALIZED STREAMS
    4.5. PUBLISHING
    4.6. PLAYBACK COLLABORATION
    4.7. JOURNALED LIST COLLABORATION
    4.8. TAGGING
5. EXAMPLE GRAPHICAL USER INTERFACE
    5.1. COLLABORATION REQUEST SELECTORS
    5.2. OTHER EXAMPLE COMPONENTS OF A GUI
    5.3. GUI FUNCTIONALITIES
    5.4. CREATING AND MODIFYING INTERACTIVE DESIGNS

6. EXAMPLE CUSTOMER-AGENT COLLABORATION
7. EXAMPLE CUSTOMER-PEER COLLABORATION
8. IMPROVEMENTS PROVIDED BY CERTAIN EMBODIMENTS
9. IMPLEMENTATION MECHANISMS

1. General Overview

In one embodiment, a computer-implemented data processing method, computer system or computer program execute for facilitating and automating collaboration between computer users in customizing interactive designs of products. In an embodiment, a first user account may invite other user accounts to edit an interactive design, view the design, and publish modifications submitted for the design. In some embodiments, interaction of a user account with a design may include operations to review, revert and/or delete one or more modifications that another user account submitted for the design. The type of collaboration in which the user accounts may engage may depend on roles that are assigned to the user accounts. For example, a customer may edit and view their own interactive design, while other accounts may only view the customer's design. The information about the roles assigned to the user accounts may be stored in user account profiles.

In one embodiment, a computer-based collaboration system may allow user accounts to effectively and efficiently navigate through a product customization process. By providing a variety of collaboration functionalities, the system is programmed to allow user accounts to complete the customization process using, for example, fewer clicks than if the user accounts provided input to conventional collaboration tools.

To provide clear examples, certain features of the approach are described in reference to a first user account and a second user account, but other embodiments may be implemented for any number of user accounts, and any user account may collaborate with many other user accounts.

In some embodiments, a computer collaboration system receives, from a first user account, a request to allow a second user account to edit an interactive design. The request may be communicated from the first user account to the computer collaboration system as a digital electronic message, notification, pointer pointing to the request data stored on a computer server, or query specifying the request.

Data specific to the interactive design may include one or more attributes of the design and corresponding values assigned to the attributes. The attributes and the values may be digitally stored in computer memory using a data structure such as a table, linked list or array. The data specific to the interactive design are referred to as a product description data. Access to the product description data may be granted to a user account according to the role that is assigned to the user account and subject to constraints or limitations that correspond to a role. For example, some user accounts can edit the product description data, while others can only view the data.

In some embodiments, upon receiving the request from the first user account to allow the second user account to edit the interactive design, the computer collaboration system grants the second user account access to the product description data associated with the interactive design as an editor, and transmits the product description data to a second user account to cause a user interface executing on a device of the second user account to display a rendering of the interactive design.

Upon receiving one or more modifications to the interactive design from the second interface executing on the second user device, the computer collaboration system may use the received modifications to automatically generate updated product description data for the interactive design. The updated product description data may be automatically propagated from the computer collaboration system to the user devices of the first and second user accounts and used to automatically update the displays of the interactive design shown in user interfaces generated by the user devices of the first and second user accounts.

In some embodiments, a computer collaboration system receives a viewer invitation from a first user account to invite a second user account to collaborate on an interactive design as a viewer. Upon receiving the viewer invitation, the computer collaboration system may grant the second user account access to product description data for the interactive design as the viewer.

Upon receiving, from the first user account, one or more modifications to the interactive design, the computer collaboration system may automatically generate, based on the received modifications, updated product description data for the interactive design. The updated product description data may be automatically propagated to the first and second interfaces to cause the interfaces to automatically update their displays of the interactive design.

2. Example Role-Based Collaboration Platform

FIG. 1 is a block diagram showing an example computer collaboration system for providing a role-based collaborative platform. FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In FIG. 1, a computer collaboration system 100 may include user profiles 102, product data definitions 104, collaboration components 106, a product options framework 110, an attribute engine 108, one or more processors 120, and one or more memory units 122. Computer collaboration system 100 may communicate directly or via one or more communications networks 130 with one or more user devices 140A 140B, 140C, 140D.

Computer collaboration system 100 shown in FIG. 1 is provided herein to illustrate clear examples and should not be considered as limiting in anyway. Other computer collaboration systems may include additional components such as computer servers, various input/output devices, and additional software and/or hardware components that are not depicted in FIG. 1. Other computer collaboration systems may be implemented in cloud-based systems, distributed computer networks, and the like. Other computer collaboration systems may include fewer components than example computer collaboration system 100 shown in FIG. 1.

2.1. Computer Collaboration System

Computer collaboration system 100 may include one or more storage devices for storing user profiles 102. User profiles 102 may include information indicating roles assigned to individual users, access codes or keys assigned to the users, identifiers and password assigned to the users, and the like.

Computer collaboration system 100 may also include one or more storage devices for storing product data definitions 104. Product data definitions 104 may include product descriptions of one or more interactive designs that offered by computer collaboration system 100. A product description of an interactive design may include a set of attributes that are associated with the design and default values that may be assigned to the attributes of the design.

An interactive design can be defined as the subset of the custom product attributes that may be altered, added, manufactured, or embellished for the purpose of custom product manufacturing. While the product attributes are product specific, they may include the substrate color or material choice for an area of the product, the trim material or color of a product, printed, engraved or embroidered embellishments, and/or color palettes applied to the design.

Attribute definitions and types, as well as default values for the attributes of an interactive design may be provided by a manufacturer or a designer of the design. The attributes and default values may be changed by the users according to the roles assigned to the users. For example, a user who is assigned a role of an artistic designer may be allowed to edit/modify the attributes associated with the design, edit the default values of the attributes, as well as edit the ranges of the values that may be assigned to the attributes.

For example, if an interactive design is a mug, then an artistic designer may define several attributes for the mug and define default values for the attributes. The attributes may include a color, a size, a label, and an ornamental design imprinted on the mug. The default values for the attributes may include red for the color, large for the size, hello for the label, and white stripes for the ornamental design. The artistic designer may also define that a customer may modify the color of the mug by selecting either red or blue and may modify the size of the mug by selecting either large or small.

In some embodiments, a product description may include, or be associated with, a journaled list of modifications that have been submitted by users for an interactive design. The list may also include other information such as identifiers of the users who provided the modifications, a history log of the modifications that have been accepted, reverted or deleted, comments that have been provided by the user, and the like. For example, one or more modifications stored in the list may be undone or redone by using a couple of clicks, not by preforming countless clicks to undo or redo the customization as in conventional customization platforms.

2.2. Collaboration Components

Computer collaboration system 100 may include one or more software applications configured to implement collaboration components 106. Collaboration components 106 may include modules that are used to implement a role-based collaboration between users. The types of the modules included in collaboration components 106 may vary and may depend on the implementation of platform 10. In the example depicted in FIG. 1, collaboration components 106 include components configured to generate a plurality of representations. The examples of the representations are not shown in FIG. 1, but they are, however, described below.

2.2.1. Attribute Representations

Collaboration components 106 may include a component that is used to store a representation of attributes of an interactive design. The attributes may correspond to characteristics of the products and may be selected or provided by manufacturers of the products. The attributes may have assigned default values and the default values may be assigned either by the manufacturers, system administrators managing computer collaboration system 100 or platform 10, or artistic designers, as described earlier.

Descriptions of the attributes for each interactive design, or groups of designs, may be stored as part of collaboration components 106 or in a separate data structure that may be organized as a data table or storage space that is accessible to collaboration components 106. The descriptions of the attributes and values of the attributes associated with the products may be provided and/or requested by other components of computer collaboration system 100, such as a product options framework 110, which is described later.

For each interactive design available for customization using platform 10, default values of the attributes associated with the product may be modified by users according to the roles assigned to the users and according to the manufacturing constraints provided by a manufacturer. For example, if a customized product is a tee-shirt, its default color may be red, but a user may modify the color by selecting any of three colors (e.g., red, green, or blue) to the tee-shirt. The modification may be stored in, for example, product data definitions 104.

2.2.2. Representations of User Interface Elements

Collaboration components 106 may include a component that is used to store a representation of user interface elements that users may use to collaborate with each other and to customize interactive designs.

A user may modify values of attributes defined for an interactive design by using user interface elements presented and displayed for the user in a user interface. Examples of user interface may include a graphical user interface, a command-line interface, and the like. The user may use the user interface elements to customize/modify a style, color, size, label, ornamental design, surface qualities, material type, and the like of the interactive design. Furthermore, the user may customize individual portions of the customizable product or groups of portions of the customizable product.

The type and selection of user interface elements to be provided to a user may depend on a role assigned to the user. For example, if a user is a customer, then the user may edit his own interactive design, and thus he may be provided with a user interface that includes the interface elements that allow the user to edit and view the design, invite others to help the user in editing the design, invite others to view the design, and the like.

User interface elements may be specific not only to a role assigned to a user, but also to an interactive design itself. For example, if platform 10 offers customizable ties and customizable scarfs, and a user profile for a user includes information indicating that the user is a male, then it is assumed that the user might want to customize a tie, not a scarf. Furthermore, it may be assumed that the user would like to customize a color, a material and a shape of the tie. Based on that information, collaboration components 106 may select the user interface elements that are specific to the tie and to the selection of the tie attributes.

2.2.3. Representations of User Interface Elements for Design Areas

Collaboration components 106 may include a component that is used to store a representation of graphics user interface elements associated with design areas of a customizable product. Design areas may include one or more areas defined within the customized product that a user may customize and/or modify. For example, if platform 10 offers customizable mugs, then design areas may include an area for showing an outside surface of the mug, an area for showing an inside surface of the mug, and an area for showing a surface of the mug handle. A product description for the design may specify that a user may modify the appearance of each of the surfaces separately, or that the user may group the surfaces and modify the group.

2.2.4. Representations of Finished Customized Products

Collaboration components 106 may include a component that is used to store a representation of a finished customized product as a fully rendered image. Rendering of the image may reflect the effect of sequentially applying all the modifications provided by users during a design collaboration. The representation of the finished customized product may include the rendering of the customized product as the product would appear after the customization process is completed.

2.2.5. Representations of Products During a Customization Phase

Collaboration components 106 may include a component that is used to store a representation of a product during a customization phase as a user customizes an interactive design. For example, if a user modifies the attributes associated with the design, the modifications may be translated into serialized customization actions and the corresponding serialized customization data may be stored in a journaled list of the modifications. The modifications may be used to render one or more representations of the design as the customization of the product progresses. The rendered representations may be displayed in a user interface generated for the user.

2.2.6. Representations of Product Views

Collaboration components 106 may include a component that is used to store one or more representations of one or more views of an interactive design as the design is updated by users. The views may also include specific views of the product attribute group or groups that are filtered according to a task that the user is performing and/or according to a role that is assigned to the user.

2.3. Product Options Framework

Product options framework 110 may be configured to communicate with a rendering framework 130, an accessories framework 132, a bundling framework 134, and a defaulting framework 136. For example, product options framework 110 may be configured to receive inputs from rendering framework 130 to generate a rendering of an interactive design based on, at least in part, a current representation stored in collaboration components 106.

Product options framework 110 may be also configured to receive inputs from accessories framework 132 to determine one or more accessories for an interactive design, and to include the determined accessories in the customization of the product.

Furthermore, product options framework 110 may be configured to receive inputs from building framework 134 to determine constraints for customizing an interactive design. This may include determining one or more attributes that are associated with the design and that can be customized by users. This may also include assigning default values to the determined attributes, determining ranges of values for the attributes, and/or determining sets of values that may be assigned to the attributes.

Product options framework 110 may be also configured to receive inputs from defaulting framework 116 to determine a default design for an interactive design, determine default roles that may be assigned to the user, and determine initial values for various parameters and attributed associated with the designs and collaboration sessions.

2.4. Attribute Engine

Attribute engine 108 may be configured to facilitate role-based collaboration of customizable product according to roles assigned to users and according to manufacturing constraints set forth for the products.

Attribute engine 108 may be configured to, for example, interact with collaboration components 106, product options framework 110, frameworks 130-136 and user devices 140A-140D to allow the users using devices 140A-140D to collaborate in customizing interactive designs offered by platform 10.

In some embodiments, attribute engine 108 may be configured to interact directly with users of user devices 140A-140D. In other embodiments, attribute engine 108 may be configured to interact with users of user devices 140A-140D via a computer network 130, as shown in FIG. 1.

Computer network 130 may be implemented as any type of communications network, including a local area network (LAN), wide area network (WAN), a wireless network, a secure virtual LAN (vLAN), a secure virtual WAN (vWAN), and the like.

2.5. User Devices

User devices 140A-140D may include any type of communications devices configured to facilitate communications between users of user devices 140A-140D and computer collaboration system 110. In the example depicted in FIG. 1, a user device 140A is a laptop, a user device 140B is a personal computer, a user device 140C is a personal assistant device, and a user device 140D is a mobile device such as a smartphone. The types and counts of user devices 140A-140D are not limited to the examples shown in FIG. 1. For example, even though FIG. 1 depicts only one laptop 140A, one personal computer 140B, one personal assistant 140C and one smartphone 140D, platform 10 may include a plurality of laptops 140A, a plurality of personal computers 140B, a plurality of personal assistants 140C and/or a plurality of smartphones 140D. In other examples, user devices may include fewer devices than those depicted in FIG. 1.

3. User Roles

Various roles may be assigned to users who interact with computer collaboration system 110 via user devices 140A-140D. Examples of roles may include a customer role, a customer support agent role, a graphics designer role, a customer peer role, and a customer product artist role. Based on the assigned roles, the users may be granted access to a product description of an interactive design as editors, viewers, managers, and the like.

A customer role may be assigned to a user who is a customer and who wants to customize one or more interactive designs offered by platform 10. A customer may, for example, edit/modify attributes of an interactive object, view a rendering of the customized design, publish the customized design, request that another user (a designer or a customer support agent) modifies the interactive design according to the users' description, request a list of modifications that the user proposed for the interactive design, and/or delete or revert some of the modifications included in the list.

A customer support agent role may be assigned to a user who may assist other users in customizing an interactive design. A customer support agent may, for example, help in modifying the interactive design, provide various views of the rendered design, publish the rendered design on behalf of the user, and the like.

A graphics designer role may be assigned to a user who may assist in defining attributes for an interactive design, defining default values for the attributes for the design, defining ranges of the values for the attributes for the design, and/or customizing the interactive design. For example, a graphics designer may define a set of attribute-default values pair and store the pairs in product data definitions 104. A graphics designer may also define a set of roles that may be assigned to the users and store the set of roles in user profiles 102.

A customer peer role may be assigned to a user who may view an interactive design customized by someone else. A customer peer may, for example, view the interactive design as a customer customizes the design and provide comments or feedback on the design to the customer. A customer peer may be granted access to a product description for the customized design, and in some embodiments, may modify the attributes associated with the design.

A customer product artist role may be assigned to a user who may provide tutorials and online help in customizing interactive designs. A customer product artist may define attributes for the designs, determine default values for the attributes, determine ranges of values for the attributes, determine the roles for the user who may be allowed to customize the interactive designs, and/or demonstrate how to use the customization functionalities.

4. Collaboration Examples

Collaboration platform 10 may support a variety of collaboration sessions. The collaboration session may be established between two or more users. The types of collaboration sessions may depend on the roles that are assigned to the users who participate in the sessions. For example, a customer may collaborate with a customer support agent, engage in a creative work with a graphic designer, ask an agent or a designer for help in modifying a custom product template, collaborate with the customer's peers, watch a custom product designer create a design in real time, watch a custom product designer demonstrate how to create a design offline, watch a preview of how to create a specific custom product, and/or watch an edited set of journaled actions performed by a graphics artist to learn how to solve a specific design problem.

4.1. Customer-Agent Collaboration

A customer may collaborate with a customer support agent and/or a designer. For example, a customer may request that a customer support agent help the customer to customize an interactive design and show the customer how the agent would modify the interactive design to achieve the design that the customer would like to see.

Examples of collaboration sessions between a customer and a customer support agent and/or a designer may include situations when a customer is exploring a product webpage in a marketplace site and needs help tweaking the design, such as a party invitation, a mug design, and the like. Another example may include a situation when a customer is exploring a product webpage in a marketplace site depicting a picture of a mug and wants to tweak the design. Other example may include a situation when a customer found an interesting design of a wedding invitation, a holiday card, a custom blanket or the like, but does not know how to modify the design. In some other situations, a customer wants to contact a customer service or call a helpdesk and ask for an assistance in using the collaboration tools.

Figure 2:
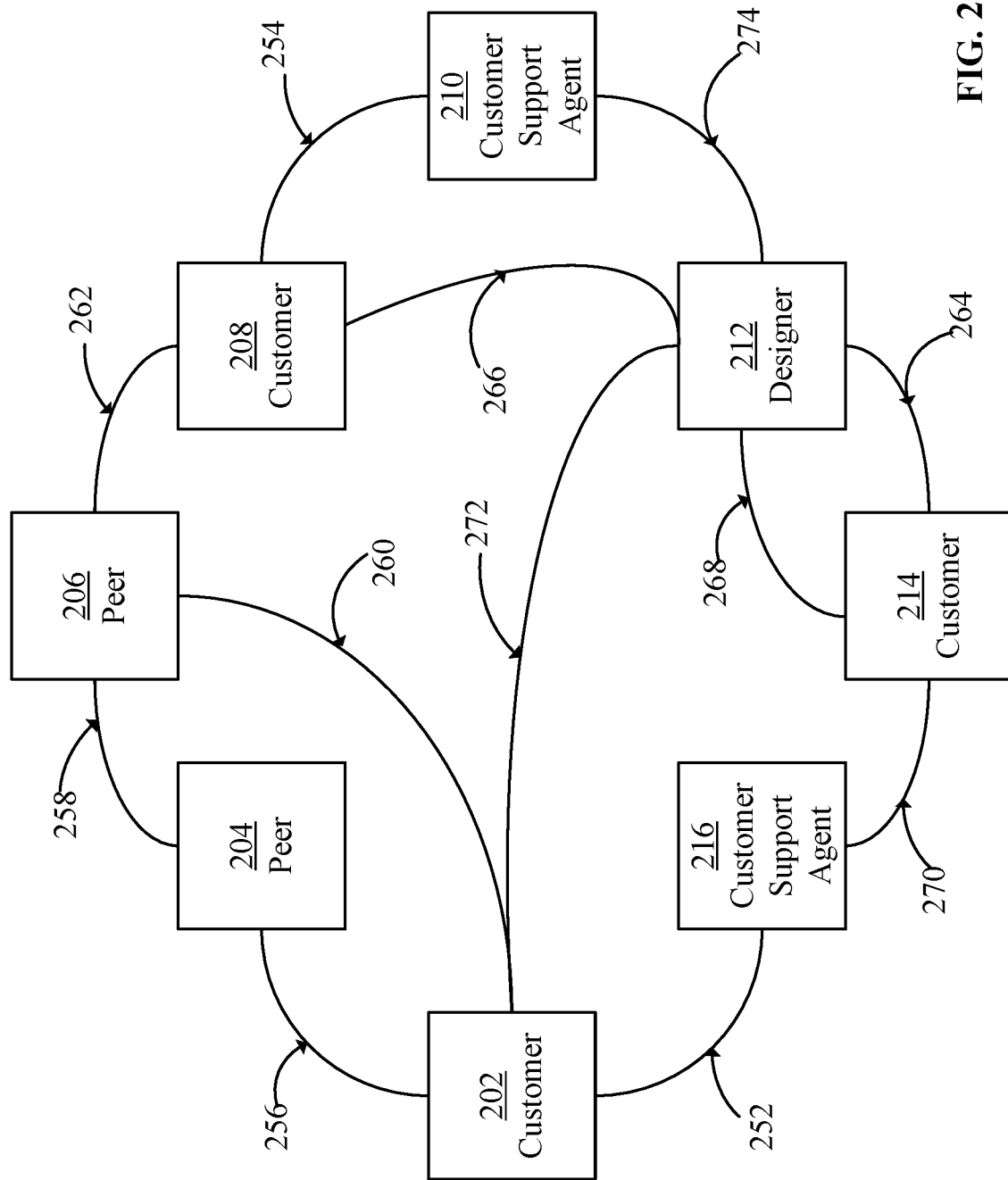
FIG. 2 is a block diagram showing collaboration examples.

FIG. 2 is a block diagram showing collaboration examples. In FIG. 2, examples of customer-agent collaboration sessions include a session 252 between a customer 202 and a customer support agent 216, a session 254 between a customer 208 and a customer support agent 210, a session 264 between a customer 214 and a designer 212, a session 266 between customer 208 and designer 212, a session 268 between a customer 214 and a designer 212, a session 270 between a customer 214 and customer support agent 216, and a session 272 between customer 202 and designer 212.

In some embodiment, a customer may use email, text, phone, and any other type of communications to describe to a customer support agent the design that the customer would like to achieve. Once the customer explains to the agent the desired design, the customer may select, from his user interface, a user interface element that would allow setting an editor role to the agent so that the agent could edit the interactive design for the customer. This would include granting the agent access to a product description associated with an interactive design as an editor.

In response to that, the agent may be provided with an updated user interface or a new user interface that would allow the agent to modify the interactive design. For example, the agent could select, from his user interface, a location-based attribute (or a group of attributes) and modify a value associated with the attribute, select another attribute and modify it, and so forth. Each modification may be automatically saved as a serialized key-value pair, and this solves the technical problem of navigating through countless sets of attributes and dealing with, for example, countless clicks to complete the customization as required in conventional customization platforms. The pairs may be transmitted to a product options framework, which would update the product description for the interactive design. Then, a product options framework may render a modified depiction of the interactive design and propagate the rendering to the user devices for rendering in the corresponding user interfaces. An example of collaboration between a customer and a customer support agent (or a designer) is described in detail in FIG. 4.

4.2. Customer-Peer Collaboration

A customer may collaborate with a customer peer. For example, a customer may request that a peer view an interactive design that the customer is working on, and, for example, provide feedback to the customer. Referring to FIG. 2, examples of this type of collaboration sessions include a session 256 between customer 202 and a peer 204, a session 260 between customer 202 and a peer 206, and a session 262 between customer 208 and peer 206.

To involve a peer in a collaboration session, a customer may select, from his user interface, a user interface element that would allow setting a viewer role to the peer so that the peer could view the interactive design as the customer modifies the design. This would include granting the peer access to a product description associated with an interactive design as a viewer.

In response to that, the peer may be provided with an updated user interface or a new user interface that would allow the peer to view the interactive design. Once the customer selects, from his user interface, a location-based attribute (or a group of attributes) and modifies a value associated with the attribute, and so forth, each modification would be reflected in a user interface displayed for the peer. Each modification performed by the customer may be saved as a serialized key-value pair, and the pairs may be transmitted to a product options framework, which may update the product description for the interactive design. Then, the product options framework may render a modified depiction of the interactive design and propagate the rendering to the user devices for rendering in the corresponding user interfaces.

Once the peer has a chance to view, in the peer's user interface, the rendering of the interactive design, the peer may provide his feedback and comments to the customer. The peer may provide his feedback/comments to the customer via email, text, phone, or the like. An example of collaboration between a customer and a peer is described in detail in FIG. 5.

4.3. Educational and Management Collaboration

Designers, artists and customer service agents may prepare, and broadcast tutorials and lectures related to product customization and tools configured to customize the products. For example, a designer may announce a tutorial collaboration session to a group of users and allow the users to join his collaboration session at a given day and at a given time.

Managers of marketplace websites and developers of product customization sites may monitor collaboration sessions established between users who access the sites. For example, a site manager may want to monitor the quality of customer support team by tapping to the collaboration sessions that the customer support teams use to provide support to customers.

Managers and developers of marketplace websites may communicate with each other via collaboration sessions to discuss improvements to their sites, customer services, and product handling alternatives.

Social media coordinator may contact managers and developers of marketplace websites via collaboration sessions to seek advice on designing products such as event flyers, event invitations, promotional materials, brand paraphernalia and insignia, and other products. The coordinators may also provide, via the collaboration sessions, feedback on the marketplace websites, the customer services, and potential improvements.

4.4. Collaboration Using Serialized Streams

Two or more users may communicate and collaborate with each other using serialized streams such as side channels. The serialized streams may be configured to support multi-party communications such as text messaging, voice communications, and video communications. Referring to FIG. 2, examples of this type of collaboration sessions include a session 258 between peer 204 and peer 206, and a session 274 between designer 212 and customer support agent 210.

For example, a customer may design an initial version of an interactive design and, using the approach described above, invite his peer to view the design. Using an additional communications side channel, the peer may provide comments on the design, suggest changes to the design, or ask questions about the design. The customer may use the same side channel to provide comments, questions and/or suggestions to the peer. The customer and the peer may communicate with each other via the side channel by exchanging text messages, voice messages and/or video communications.

4.5. Publishing

A user may publish his own interactive design to a collaboration team. For example, using the functionalities of a user interface, a user may select a user interface element that is configured to publish a collaboration invitation to his collaboration team. The invitation may be encoded with a key that allows the users of the collaboration team to view a sequence of edits that the user has been making to his own interactive design. The collaboration team may passively watch the design process in real time and may comment on the design using, for example, an additional communications channel, described above.

In broad terms, publishing may include publishing a list of editing instructions so that the instructions may be viewed by other users and publishing a list of editing instructions so that other users may, in turn, perform editing actions on the list of editing instructions. For example, the users may change, in the list of instructions, some key-value pairs or groups that are tagged for easy replacement.

4.6. Playback Collaboration

A user may use a collaboration platform to journal modifications made to an interactive design and to playback the journaled modifications. For example, a user may select, from a user interface, a user interface element that is configured to mark a start point in a journaled list. As the user performs a series of edits on the interactive design, the modifications, including key-value pairs, are transmitted to a product options framework which stores the key-value pairs in the journaled list. When the user finishes modifying the interactive product, the user may select another user interface element that instructs the product options framework to mark an end point in the journaled list. Then, the user may select a user interface item to playback the journaled instructions from the start point to the end point to view the series of modifications performed by the user on the interactive design.

4.7. Journaled List Collaboration

A user may collaborate with other users to modify a journaled list. For example, a user may select a set of user interface elements that are configured to transmit key-value pairs from the user interface to a product options framework as the user modifies an interactive design. Upon receiving the pairs, the product options framework may store the pairs in a journaled list and allow the user and his peers to perform editing or transformation operations on the list.

The types of editing or transformation operations that may be performed on the journaled list may include modifying values within a specific key-value pair stored in the list and modifying a single product attribute in a product description associated with the interactive design. The operations may also include removing a specific key-value pair from the list; removing all key-value pairs and associated data that do not directly contribute to a final form of the interactive design; re-ordering the key-value pairs and associated data, so that a final form of the interactive design is preserved, and edits that apply to a specific attribute group are performed in-sequence; and extending an editing operation and re-ordering operations, then grouping certain key-value pairs related to specific attribute groups, design areas, or location-based attributes, so that they may be edited as a single group. The operations may also include extending the editing operation listed above, so that key-value pair groups may be stored in memory for use later.

4.8. Tagging

A user may collaborate with other users in creating and using tags. For example, a user may tag key-value pairs that apply an image, a vector graphic, a 3D model or other media to an interactive design so that the tagged object may be easily replaced in future edits. The operations may also include tagging key-value pairs that apply the text, color, surface qualities or other attribute groups, so that the attributes may be easily replaced in future edits. This may allow customizing an interactive design using a couple of clicks, not navigating through countless clicks as required by conventional platforms to complete the customization.

Tagging may also include associating text, voice and/or video annotation with a specific key-value pair or key-value group in a journaled list. Tagging may also include uploading, converting, parsing and/or transforming editing operations from another compatible source and applying the editing operations to a product description associated with the interactive design.

5. Example Graphical User Interface

In the context of role-based collaboration, a graphical user interface (GUI) may be designed to support collaboration between users on interactive designs. The GUI may be used to, for example, facilitate collaboration between customers, peers, customer support agents, designers and others by providing the functionalities that allow enhancing the product customization process. The organization and appearance of the GUI may vary and may depend on the implementation. An example of the GUI designed to facilitate collaboration is described below.

Figure 3:
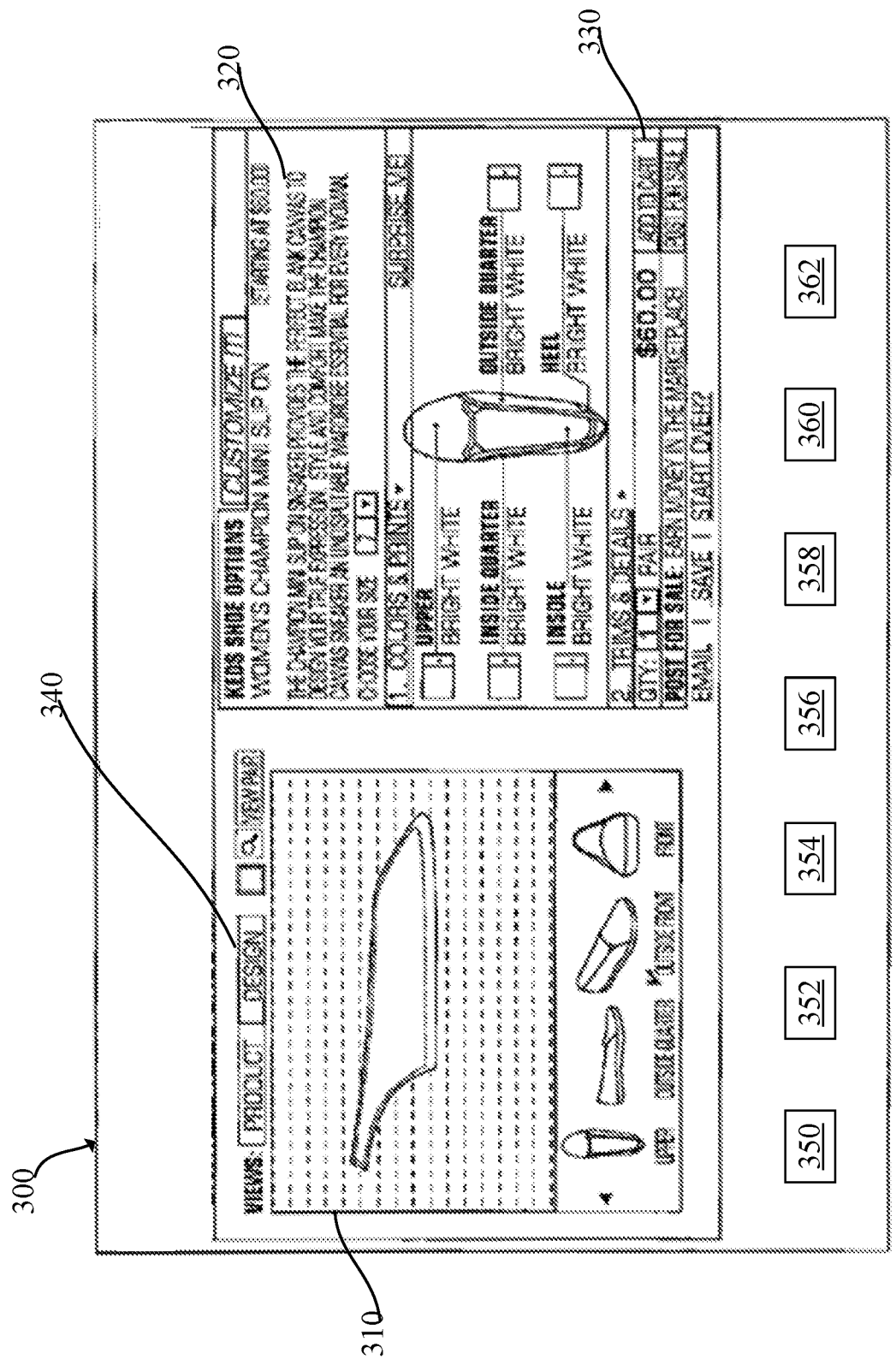
FIG. 3 shows an example graphical user interface configured to enable a role-based collaborative design of custom products based on manufacturing constraints.

FIG. 3 shows an example graphical user interface 300 configured to enable a role-based collaborative design of custom products based on manufacturing constraints. GUI 300 includes a design area 310, a product attribute area 320, a trim and detail area 330, a tab area 340, and one or more functional request selectors 350-362 that are configured to provide support for a role-based collaborative design. In other implementations, GUI 300 may include additional areas, request selectors, sliders, text boxes, and other interactive objects and elements. In other implementations, GUI 300 may show a different arrangement of the interface components than the one shown in FIG. 3.

5.1. Collaboration Request Selectors

One or more functional request selectors 350-362 may be configured to facilitate collaboration between users. The arrangement and appearance of request selectors 350-362 may vary. Some of the request selectors may be implemented as push-buttons, others may be implemented as touch-sensitive objects, touch-screen areas, selectable objects, toggles or switches.

To provide clear examples, request selectors 350-362 shown in FIG. 3 are implemented as selectable objects and include a request selector 350 for requesting a collaboration with a customer support agent or a designer (as described in section 4.1); a request selector 352 for requesting a collaboration with a customer peer (as described in section 4.2); a request selector 354 for requesting a serialized channel to communicate with other users (as described in section 4.4); a request selector 356 for requesting publishing functionalities (as described in section 4.5); a request selector 358 for requesting playback functionalities (as described in section 4.6); a request selector 360 for requesting collaboration on a journaled list (as described in section 4.7); and a request selector 362 for requesting tagging functionalities (as described in section 4.8). Other implementations of GUI 300 may include additional request selectors and additional request selector functionalities.

5.2. Other Example Components of a GUI

Design area 310 may include one or more regions for displaying one or more two-dimensional (2D) views of an interactive design. Design area 310 may also include one or more 3D views of the interactive design, and/or one or more 2D/3D views of components of the interactive design. The example shown in FIG. 3 depicts design area 310 having a region for showing a part component of an interactive design of a shoe, and a region for showing different views of the shoe.

Product attribute area 320 may include one or more regions for displaying a variety of attributes defined for an interactive design, corresponding selectors for selecting values for the attributes, and different interactive objects for customizing the interactive design.

Trim and detail area 330 may include one or more regions for displaying a variety of options for, for example, ordering a product corresponding to an interactive design shown in design area 310. Trim and detail area 330 may include, for example, a region for displaying interactive buttons for ordering the product, for specifying shipping instructions, and so forth.

Tab area 340 may include one or more interactive tab-objects configured to allow a user to select different sets of the GUI's functionalities. Tab area 340 shown in FIG. 3 shows three tab-objects; however, the count and types of the tab objects is not limited to the ones shown in FIG. 3. A first tab-object may allow a user to select, for example, the functionalities for creating and modifying an interactive design. A second tab-object may allow the user to select the functionalities for displaying views of a product corresponding to the interactive design. A third tab-object may allow the user to search the GUI's functionalities, and a fourth tab-object may allow the user to select a new design or start modification to a default design.

5.3. GUI Functionalities

GUI 300 may provide support for displaying a set of attributes defined for an interactive design and for modifying the values of the attributes. In some embodiments, the attributes and attribute values may be displayed in, for example, product attribute area 320 shown in FIG. 3.

Example of the attributes may include substrate choices (such as a substrate color, a substrate texture, and a substrate size), customization process choices (such as process constraints, process manufacturing information structure), and design area choices (such as design area constraints and a design area mapping).

GUI 300 may provide support for a variety of choices for design interactions. The choices may be filtered by product choices, process and design area constraints, design area choices, and graphics choices. The graphics choices may include images, vectors, shapes (such as a circle, rectangle, polygonal, and curvilinear), lines (such as thickness and color), and fill (such as color and texture). Graphics choices may also include selections based on a cut area, embossing/debossing, and surface characteristics (such as color, reflectivity, refraction, diffraction, transparency and texture).

GUI 300 may provide support for a variety of edit actions that users may perform with respect to interactive objects. The edit actions may include adding a graphics or decorative entity to the design and modifying the graphics or decorative entity in the design. This may include transformations (such as translation, rotation, scaling, shearing, mirroring, deformation, and projection). The edit actions may also include a vector change, a cut area change, an embossed area change and a surface change. In some embodiments, the edit functions may be encoded as a structure data stream.

In some embodiments, an edited interactive design is represented in a form of an active data model and associated edit data. The model may impose constraints on the design, filter edits based on substrate choices, filter edits based on a customization process, and remap edits based on an input design area view.

An active data model may be updated for each shared view available in GUI 300. The updates for a given view may be rendered or filtered based on a device type, a user role, and/or a design view.

In some embodiments, encoded edit data and an active data model may be journaled. The journaling may be performed according to actions pertaining to a specific custom product, actions pertaining to a specific shared session, and actions pertaining to a design of a custom product.

Encoded edit data and an active data model for an interactive design may be shared between users. The sharing may be performed in real time or a pseudo real time. Encoded edit data and an active data model for an interactive design may be used to archive edit state for the design. For example, journaled data and model may provide undo operations, version control of shared design session operations, playback of a shared design session operations, and the like.

5.4. Creating and Modifying Interactive Designs

Example GUI 300 shown in FIG. 3 may be used to support collaborations between users in a process of customizing interactive designs. Customization of an interactive design may include creating the design and modifying the design. To be able to customize the design, the customer may request access to a product description data associated with the interactive design. To be able to collaborate with others, such as peers, customer support agents, graphics designers and others, the customer may request collaboration sessions using, for example, the functionalities of request selectors 350-362, shown in FIG. 3.

To initiate a modification session, a computer collaboration system may generate a user interface for a user. The interface may be generated based on, at least in part, information stored in a user profile. That information may include information indicating user's role. The user interface may include the functionalities that are specific to the user, and that allow the user to collaborate with others, modify the attributes of an interactive design, store the modifications in a product description associated with the interactive design, store the modifications in a journaled list of modifications for the interactive design, prune and reorder the journaled list, and publish the rendering of the modified interactive design.

In some embodiments, the computer collaboration system may cause displaying, in a user interface executing in a user device of the user, an interactive design along with annotations representing attributes, attribute groups and the locations within the design to which the attributes apply. The attributes, default values for the attributes and default ranges for the values for the attributes may be provided by an attribute engine which may be part of the computer collaboration system. The attribute engine may define and/or filter the attributes according to constraints provided by manufacturers, designers or system administrators.

In response to receiving, in the user interface, a rendering of the interactive design with the annotations, a user may select, using the functionalities of the user interface, a specific attribute or a specific attribute group at a specific location within the depiction of the interactive design and select or adjust a value associated with the attribute. For example, the user may select a width-attribute and use a slider object, provided by the user interface, to set a new value for the width parameter. The new value of the parameter may be transmitted as a serialized key-value pair to a product options framework.

Upon receiving a serialized key-value pair, the product options framework may store the serialized key-value pair in a journaled list of modifications for the interactive design.

Upon receiving a request to view the journaled list from the user, the attribute engine may provide the journaled list to the user interface executing on the user device and cause the user interface to display the journal list. At this point, the user may review the modifications included in the journaled list, reorder the modifications included in the list, remove some modifications from the list and/or request applying of the modifications included in the list to the interactive object. The user may also request generating a rendering of the current interactive design. If the rendering of the current interactive design is completed, the user may view the rendering in any of a plurality of available views.

In some embodiments, the user may accept the rendered depiction of the modified design and request that the customized design be sent to a manufacturer or a distributor. Then the user may place an order for an actual product that is based on the customized design provided to the manufacturer or distributor.

6. Example Customer-Agent Collaboration

In some embodiments, a customer who tries to customize an interactive design may seek assistance from a customer support agent or a graphics designer. Suppose that the customer is trying to modify some attributes of the interactive design to achieve a particular appearance of the design; however, he would like to ask a customer support agent for help in modifying the design. The customer is referred to herein as a first user, while the agent is referred to a second user.

Figure 4:
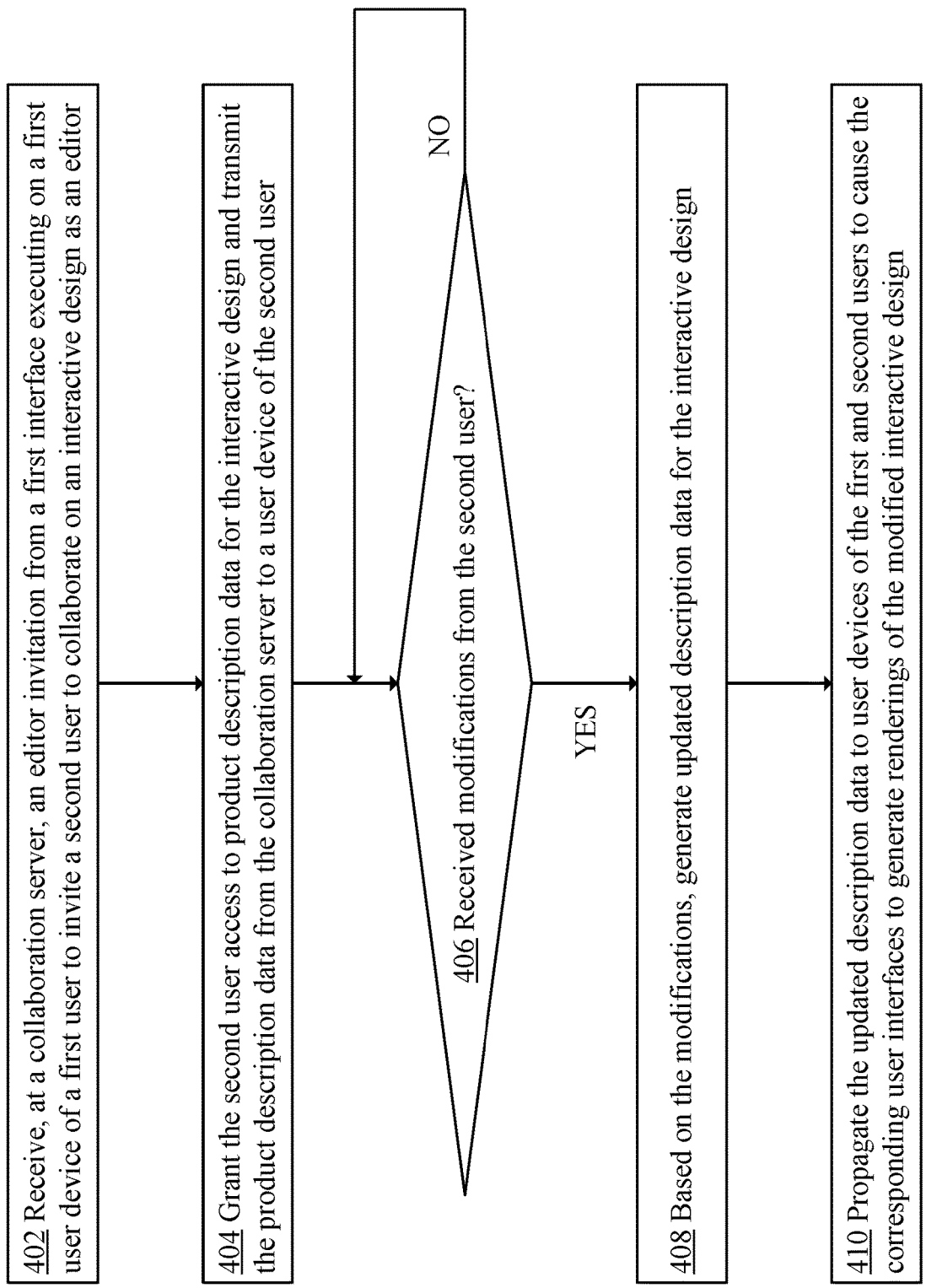
FIG. 4 is a flow diagram showing an example process implementing role-based collaboration between a customer and a customer support agent.

FIG. 4 is a flow diagram showing an example process implementing role-based collaboration between a customer and a customer support agent. FIG. 4 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

In step 402, a computer collaboration system receives an editing invitation from a first interface executing on a first user device associated with a first user. The editing invitation may be sent to invite a second user to collaborate on an interactive design as an editor. The invitation may also indicate that the first user wants the computer collaboration system to grant the second user access to data that is specific to the interactive design. The data may be stored as product description data of a product description in, for example, product data definitions 104, shown in FIG. 1.

In step 404, the collaboration system grants the second user access to the product description data for the interactive design and transmits the product description data to a user device of the second user. In some embodiments, the collaboration system may also transmit access key to the second user to allow the second user to access the product description data associated with the interactive design. Furthermore, since the second user is invited to edit the interactive design, the collaboration system may access user profile data 102 to verify a role assigned to the second user, and update user profile data 102 for the second user if needed.

Granting the second user access to the product description data of the interactive design as an editor will allow the second user to not only modify the attributes of the interactive design, but also to save the modifications in a journaled list. For example, if the second user modifies the interactive design, then the modification may be stored in a journaled list associated with the product description of the interactive design.

Typically, a modification is used to modify a single product attribute of the interactive design. However, if the second user modifies several attributes, then each key-value pair may be added to the journaled list. A key-value pairs and associated data may be stored in the journaled list according to a chronological order or any other order defined by the users.)

A journaled list may be modified by users who have assigned roles as, for example, customers, customer support agents, or designers. They may remove a modification and remove a corresponding key-value pair and corresponding data associated with the modification from the product description for the interactive design.

In step 406, the collaboration system determines whether any modifications for the interactive design are received from the second user. If the modifications are received from the second user, then the collaboration system performs step 408. Otherwise, the collaboration system performs step 406.

In step 408, the collaboration system parses the modifications received from the second user, and based on the parsed information, generates updated product description data for the product description for the interactive design.

In step 410, the collaboration system propagates the updated product description data to the user interfaces executing on the user devices of the first and second users to cause the user interfaces to generate and display corresponding renderings of the modified interactive design.

7. Example Customer-Peer Collaboration

In some embodiments, a customer may seek feedback from his peers on an interactive design. Suppose that the customer is trying to modify some attributes of the interactive design to achieve a particular appearance of the design, and the customer would like to ask his peer for his opinion on the customization. The customer is referred to herein as a first user, while the peer is referred to a second user.

Figure 5:
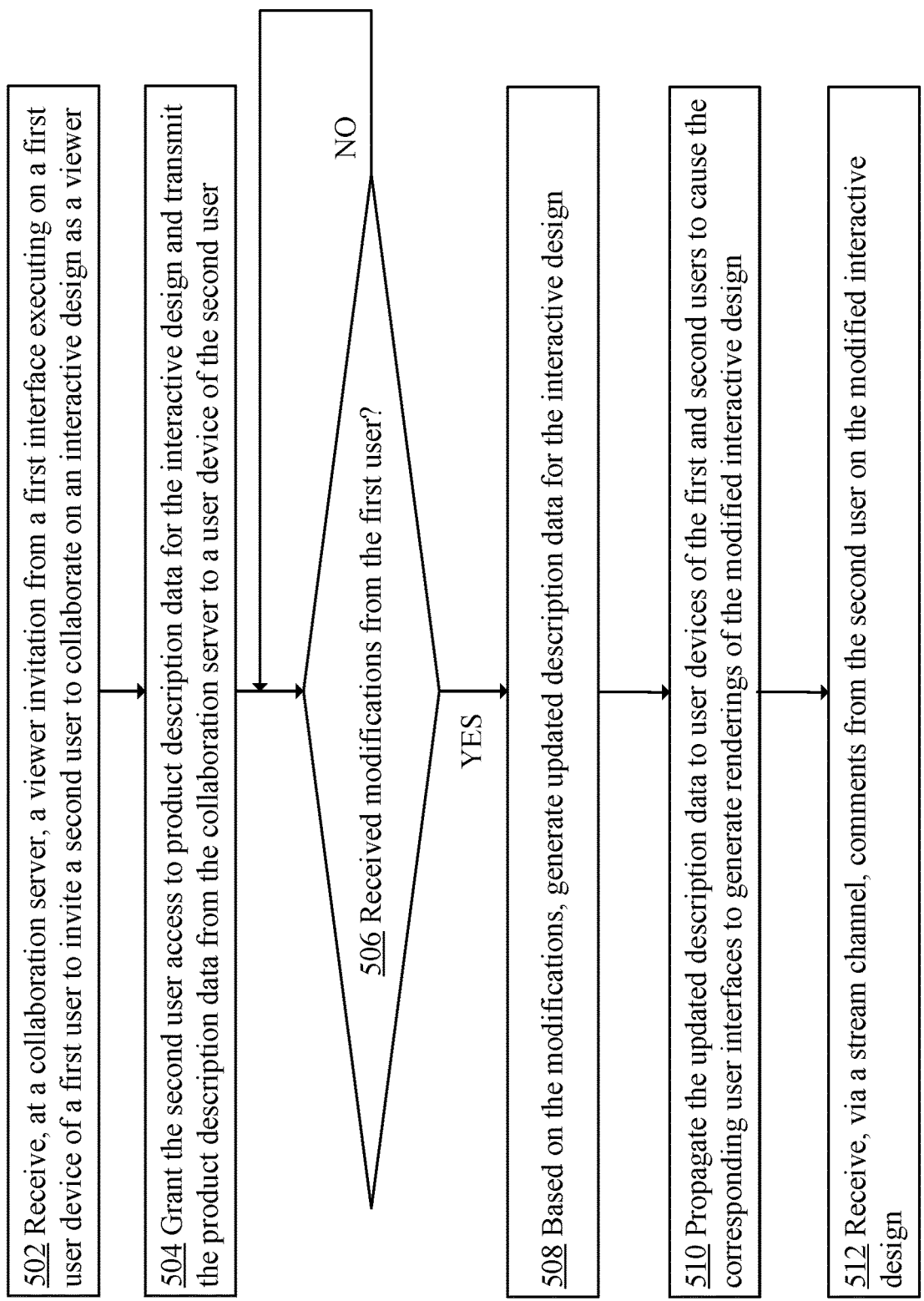
FIG. 5 is a flow diagram showing an example process implementing role-based collaboration between a customer and a customer peer.

FIG. 5 is a flow diagram showing an example process implementing role-based collaboration between a customer and a customer peer. In step 502, a computer collaboration system receives a viewer invitation from a first interface executing on a first user device associated with a first user. A viewer invitation may be sent to invite a second user to collaborate on an interactive design as a viewer. The invitation may also indicate that the first user wants the computer collaboration system to grant the second user access to product description data for the interactive design.

In step 504, the collaboration system grants the second user access to the product description data for the interactive design and transmits the product description data to a user device of the second user. In some embodiments, the collaboration system may also transmit access key to the second user to allow the second user to access the product description data associated with the interactive design.

In step 506, the collaboration system determines whether any modifications for the interactive design are received from the first user. If the modifications are received from the second user, then the collaboration system performs step 508. Otherwise, the collaboration system performs step 506.

In step 508, the collaboration system parses the modifications received from the first user, and based on the parsed information, generates an updated product description for the product description for the interactive design. In this step, the collaboration system also generates updated product description data for the product description for the interactive design.

In step 510, the collaboration system propagates the updated product description data to the user interfaces executing on the user devices of the first and second users to cause the user interfaces to generate and display renderings of the modified interactive design.

In step 512, the collaboration system receives comments from the second user on the modified interactive design and passes the comments to the first user. The comments may be received via, for example, a separate channel, such as a stream channel, described above. The comments may include an approval of the design and/or suggestions for improving the design.

The collaboration system may also receive, via the stream channel, comments from the first user, and may communicate those comments to the second user. The users may continue communicating with each other as the first user modifies the interactive design.

8. Improvements Provided by Certain Embodiments

In some embodiments, a system and a computer-implemented method allow role-based collaborative design of custom products based on manufacturing constraints. The system and method enable collaboration between many users, applications and websites and allow, for example, customers and designers to share their work and knowledge on product-customization tasks. The approach allows the customers to access, for example, many applications and websites to engage specialists and experts to provide help with specific tasks and designs.

In some embodiments, a system and a computer-implemented method allow overcoming the difficulties in navigating through countless sets of attributes and choices that are difficult to understand using conventional product-customization platforms. The method and the system provide a solution to a problem of navigating through a myriad of attributes to achieve the desired customization of the product efficiently and effectively.

A computer collaboration system may be configured to coordinate interactions between users according to the roles assigned to the users. Information about the roles assigned to the users may be used to generate improved user interfaces that are specific to the users and the users' roles.

9. Implementation Examples

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
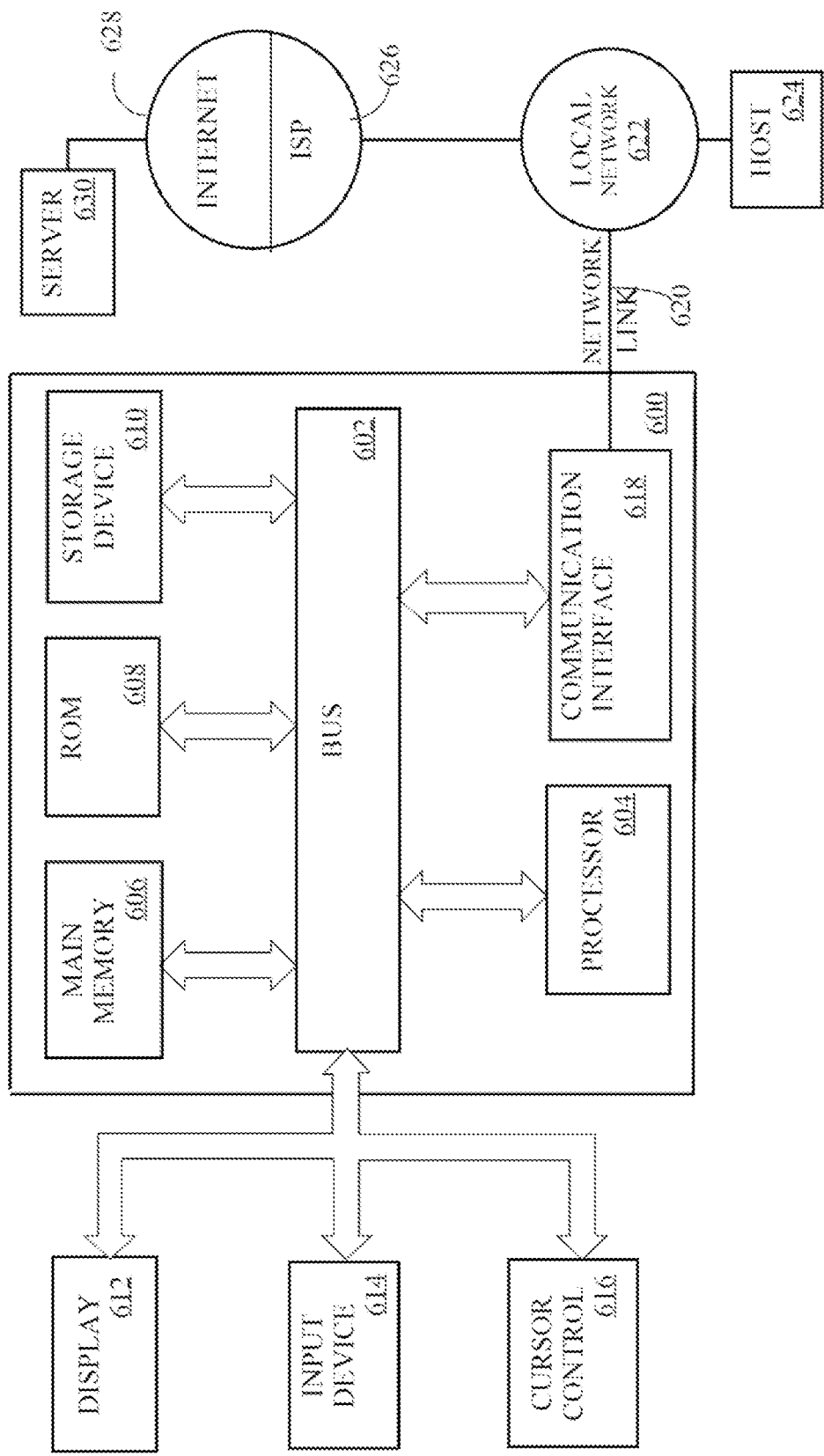
FIG. 6 is a block diagram of a computer system on which embodiments of the approach may be implemented.

FIG. 6 is a block diagram that depicts an example computer system 600 upon which embodiments may be implemented. Computer system 600 includes a bus 602 or other communication mechanism for communicating information, and a processor 604 coupled with bus 602 for processing information. Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. Although bus 602 is illustrated as a single bus, bus 602 may comprise one or more buses. For example, bus 602 may include without limitation a control bus by which processor 604 controls other devices within computer system 600, an address bus by which processor 604 specifies memory locations of instructions for execution, or any other type of bus for transferring data or signals between components of computer system 600.

An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic or computer software which, in combination with the computer system, causes or programs computer system 600 to be a special-purpose machine. According to one embodiment, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 600, various computer-readable media are involved, for example, in providing instructions to processor 604 for execution. Such a medium may take many forms, including but not limited to, non-volatile media and volatile media. Non-volatile media includes, for example, optical or magnetic disks, such as storage device 610. Volatile media includes dynamic memory, such as main memory 606. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated service digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world-wide packet data communication network now commonly referred to as the "Internet" 628. Local network 622 and Internet 628 both use electrical, electromagnetic or optical signals that carry digital data streams.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

In the foregoing specification, embodiments have been described with reference to numerous specific details that may vary from implementation to implementation. Thus, the sole and exclusive indicator of what is, and is intended by the applicants to be, the approach is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
receiving, at a computer collaboration system, a viewer invitation from a first user interface, executing on a first user device associated with a first user, inviting a second user to collaborate on an interactive design as a viewer;
granting, the second user, access to product description data, specific to the interactive design and included in a product description of the interactive design, as the viewer;
receiving a second modification to a sub-portion of the interactive design from the first user interface;
wherein the second modification is transmitted as serialized second key-value pairs, of a plurality of second key-value pairs, and includes associated data that capture details of the second modification made to the sub-portion of the interactive design;
  tagging each of the serialized second key-value pairs and the associated data based on the second modification by:
    uploading editing operations included in the second modification to the product description of the interactive design,
    converting, parsing, and transforming the editing operations included in the second modification received from another compatible source, which includes the first user interface, to transformed editing operations, and
    applying the transformed editing operations to generate a compatible second modification by tagging each of the serialized second key-value pairs that apply text, color, surface qualities or other attribute groups so that they can be replaced in future edits;
automatically generating a second updated product description data by updating the product description data for the sub-portion of the interactive design based on the compatible second modification and propagating the second updated product description data to the first user interface and to a second user interface to cause the first user interface and the second user interface to update their displays of the interactive design.

2. The method of claim 1, further comprising:
receiving, at the computer collaboration system, an editing invitation from the first user interface that executes on the first user device associated with the first user, the editing invitation comprising inviting the second user to collaborate on the interactive design as an editor, the interactive design being associated with the product description data, the interactive design comprising a graphical visual representation of a physical product that is capable of custom manufacture with a plurality of variable product attributes;
granting, the second user, access to the product description data as the editor;
transmitting, from the computer collaboration system to a second user device associated with the second user, the product description data for rendering the interactive design in the second user interface executing on the second user device;
receiving a first modification to the interactive design from the second user interface, the first modification to the interactive design being permissible only for a user account that is the editor;
wherein the first modification is transmitted as serialized first key-value pairs, of a first plurality of key-value pairs, and associated data that capture details of the first modification;
tagging each of the serialized first key-value pairs and the associated data stored in the product description according to a 3D model generated for the interactive design based on the first modification;
automatically generating a first updated product description data by updating the product description data based on the first modification and propagating the first updated product description data to the first user interface and to the second user interface to cause the first user interface and the second user interface to update their displays of the interactive design.

3. The method of claim 2, wherein granting access to the product description data is based on a role assigned to a user, wherein the role is selected from one or more of: a customer role, a customer support agent role, a graphics designer role, a customer peer role, or a custom product artist role.

4. The method of claim 3,
wherein each of the first modification and the second modification is transmitted to a product options framework that manages the interactive design and the product description data of the product description;
wherein each of the first modification and the second modification is stored in a journaled list associated with the product description;
wherein each of the first modification and the second modification is used to modify a single product attribute of the interactive design.

5. The method of claim 4, further comprising: removing a particular modification from the journaled list by causing the product options framework to remove a particular key-value pair and particular data associated with the particular modification from the journaled list;
wherein the journaled list is pruned to remove one or more key-value pairs and associated data that do not contribute directly to a final form of the interactive design;
wherein the one or more key-value pairs and associated data stored in the journaled list are reordered to preserve the final form of the interactive design.

6. The method of claim 5, further comprising:
grouping the one or more key-value pairs and associated data stored in the product description into a particular group according to one or more of: an attribute type, a design area, or a location-based attribute;
extending the editing operations to the particular group;
extending the editing operations to the particular group by allowing associating a text, an audio, or a video annotation to the particular group or an individual object in the particular group; and
extending the editing operations to allow storing the particular group in memory for a future use.

7. The method of claim 6, further comprising: extending the editing operations to allow editing objects according to a tag.

8. The method of claim 7, further comprising:
tagging each of the one or more key-value pairs and associated data stored in the product description according to one or more of: a text, a color, a surface quality, or a group attribute;
extending the editing operations to allow editing objects according to a tag.

9. The method of claim 8, further comprising:
uploading the editing operations to the product description;
wherein the editing operations are provided by one or more of: the first user, the second user, or a source configured to provide operations that are compatible with contents of the product description;
publishing the editing operations to the first user and the second user by causing displaying the editing operations in the first user interface and the second user interface;
causing each of the first user interface and the second user interface to accept modification to the editing operations;
wherein the modifications include one or more of: editing actions, editing key-value pairs, editing groups, or editing tags.

10. One or more non-transitory computer-readable storage media storing one or more instructions which, when executed by one or more processors, cause the one or more processors to perform:
receiving, at a computer collaboration system, a viewer invitation from a first user interface, executing on a first user device associated with a first user, inviting a second user to collaborate on an interactive design as a viewer;
granting, the second user, access to product description data, specific to the interactive design and included in a product description of the interactive design, as the viewer;
receiving a second modification to a sub-portion of the interactive design from the first user interface;
wherein the second modification is transmitted as serialized second key-value pairs, of a plurality of second key-value pairs, and includes associated data that capture details of the second modification made to the sub-portion of the interactive design;
tagging each of the serialized second key-value pairs and the associated data based on the second modification by:
uploading editing operations included in the second modification to the product description of the interactive design,
converting, parsing, and transforming the editing operations included in the second modification received from another compatible source, which includes the first user interface, to transformed editing operations, and
applying the transformed editing operations to generate a compatible second modification by tagging each of the serialized second key-value pairs that apply text, color, surface qualities or other attribute groups so that they can be replaced in future edits;
automatically generating a second updated product description data by updating the product description data for the sub-portion of the interactive design based on the compatible second modification and propagating the second updated product description data to the first user interface and to a second user interface to cause the first user interface and the second user interface to update their displays of the interactive design.

11. The one or more non-transitory computer-readable storage media of claim 10, storing additional instructions for:
receiving, at the computer collaboration system, an editing invitation from the first user interface that executes on the first user device associated with the first user, the editing invitation comprising inviting the second user to collaborate on the interactive design as an editor, the interactive design being associated with the product description data, the interactive design comprising a graphical visual representation of a physical product that is capable of custom manufacture with a plurality of variable product attributes;
granting, the second user, access to the product description data as the editor;
transmitting, from the computer collaboration system to a second user device associated with the second user, the product description data for rendering the interactive design in the second user interface executing on the second user device;
receiving a first modification to the interactive design from the second user interface, the first modification to the interactive design being permissible only for a user account that is the editor;
wherein the first modification is transmitted as serialized first key-value pairs, of a first plurality of key-value pairs, and associated data that capture details of the first modification;
tagging each of the serialized first key-value pairs and the associated data stored in the product description according to a 3D model generated for the interactive design based on the first modification;
automatically generating a first updated product description data by updating the product description data based on the first modification and propagating the first updated product description data to the first user interface and to the second user interface to cause the first user interface and the second user interface to update their displays of the interactive design.

12. The one or more non-transitory computer-readable storage media of claim 11, wherein granting access to the product description data is based on a role assigned to a user, wherein the role is selected from one or more of: a customer role, a customer support agent role, a graphics designer role, a customer peer role, or a custom product artist role.

13. The one or more non-transitory computer-readable storage media of claim 12, wherein the second modification is transmitted as a serialized key-value pair and associated data that capture details of a modification;
wherein each of the first modification and the second modification is transmitted to a product options framework that manages the interactive design and the product description data of the product description;
wherein each of the first modification and the second modification is stored in a journaled list associated with the product description;
wherein each of the first modification and the second modification is used to modify a single product attribute of the interactive design.

14. The one or more non-transitory computer-readable storage media of claim 13, storing additional instructions for: removing a particular modification from the journaled list by causing the product options framework to remove a particular key-value pair and particular data associated with the particular modification from the journaled list;
    wherein the journaled list is pruned to remove one or more key-value pairs and associated data that do not contribute directly to a final form of the interactive design;
    wherein the one or more key-value pairs and associated data stored in the journaled list are reordered to preserve the final form of the interactive design.

15. The one or more non-transitory computer-readable storage media of claim 14, storing additional instructions for:
    grouping the one or more key-value pairs and associated data stored in the product description into a particular group according to one or more of: an attribute type, a design area, or a location-based attribute;
    extending the editing operations to the particular group;
    extending the editing operations to the particular group by allowing associating a text, an audio, or a video annotation to the particular group or an individual object in the particular group, and
    extending the editing operations to allow storing the particular group in memory for a future use.

16. The one or more non-transitory computer-readable storage media of claim 15, storing additional instructions for;
    extending the editing operations to allow editing objects according to a tag.

17. The one or more non-transitory computer-readable storage media of claim 16, storing additional instructions for:
    tagging each of the one or more key-value pairs and associated data stored in the product description according to one or more of: a text, a color, a surface quality, or a group attribute;
    extending the editing operations to allow editing objects according to a tag.

18. A computer collaboration system comprising:
    a memory unit;
    one or more processors; and
    a computer performing:
    receiving, at a computer collaboration system, a viewer invitation from a first user interface, executing on a first user device associated with a first user, inviting a second user to collaborate on an interactive design as a viewer;
    granting, the second user, access to product description data, specific to the interactive design and included in a product description of the interactive design, as the viewer;
    receiving a second modification to a sub-portion of the interactive design from the first user interface;
    wherein the second modification is transmitted as serialized second key-value pairs, of a plurality of second key-value pairs, and includes associated data that capture details of the second modification made to the sub-portion of the interactive design;
    tagging each of the serialized second key-value pairs and the associated data based on the second modification by:
        uploading editing operations included in the second modification to the product description of the interactive design,
        converting, parsing, and transforming the editing operations included in the second modification received from another compatible source, which includes the first user interface, to transformed editing operations, and
        applying the transformed editing operations to generate a compatible second modification by tagging each of the serialized second key-value pairs that apply text, color, surface qualities or other attribute groups so that they can be replaced in future edits;
    automatically generating a second updated product description data by updating the product description data for the sub-portion of the interactive design based on the compatible second modification and propagating the second updated product description data to the first user interface and to a second user interface to cause the first user interface and the second user interface to update their displays of the interactive design.

19. The computer collaboration system of claim 18, wherein the computer further performs:
    receiving, at the computer collaboration system, an editing invitation from the first user interface that executes on the first user device associated with the first user, the editing invitation comprising inviting the second user to collaborate on the interactive design as an editor, the interactive design being associated with the product description data, the interactive design comprising a graphical visual representation of a physical product that is capable of custom manufacture with a plurality of variable product attributes;
    granting, the second user, access to the product description data as the editor;
    transmitting, from the computer collaboration system to a second user device associated with the second user, the product description data for rendering the interactive design in the second user interface executing on the second user device;
    receiving a first modification to the interactive design from the second user interface, the first modification to the interactive design being permissible only for a user account that is the editor;
    wherein the first modification is transmitted as serialized first key-value pairs, of a first plurality of key-value pairs, and associated data that capture details of the first modification;
    tagging each of the serialized first key-value pairs and the associated data stored in the product description according to a 3D model generated for the interactive design based on the first modification;
    automatically generating a first updated product description data by updating the product description data based on the first modification and propagating the first updated product description data to the first user interface and to the second user interface to cause the first user interface and the second user interface to update their displays of the interactive design.

* * * * *